(12) United States Patent
Yamaguchi

(10) Patent No.: US 8,033,485 B2
(45) Date of Patent: Oct. 11, 2011

(54) ELECTROSTATIC ATOMIZER AND COOLANT-CIRCULATING EQUIPMENT INCLUDING SAME

(75) Inventor: Tomohiro Yamaguchi, Moriyama (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 250 days.

(21) Appl. No.: 12/292,588

(22) Filed: Nov. 21, 2008

(65) Prior Publication Data

US 2009/0134248 A1    May 28, 2009

(30) Foreign Application Priority Data

Nov. 27, 2007  (JP) ................................. 2007-306618

(51) Int. Cl.
*B05B 5/00* (2006.01)

(52) U.S. Cl. ...................... 239/690.1; 239/690; 239/697; 239/698; 239/132.3

(58) Field of Classification Search ................... 239/690, 239/690.1, 697, 132.3, 698; 96/27, 53; 95/271
See application file for complete search history.

(56) References Cited

U.S. PATENT DOCUMENTS

| 7,503,512 B2 * | 3/2009 | Nakada et al. | 239/690.1 |
| 2006/0131449 A1 * | 6/2006 | Azukizawa et al. | 239/690.1 |

FOREIGN PATENT DOCUMENTS

| JP | 2006-68711 | 3/2006 |
| JP | 2007-192539 | 8/2007 |
| WO | 2006/009190 | 1/2006 |
| WO | 2008/072759 | 6/2008 |

* cited by examiner

Primary Examiner — Dinh Nguyen
(74) Attorney, Agent, or Firm — Bacon & Thomas, PLLC

(57) ABSTRACT

An electrostatic atomizer includes an atomizing electrode to which a high voltage is applied to atomize water held on the atomizing electrode so as to generate charged water particles; and a cooling unit for producing water, to be supplied to the atomizing electrode, through condensation. The cooling unit is made using a cooling part of a cooling cycle which circulates a coolant between a heat-radiating part and the cooling part. A coolant-circulating equipment incorporating the electrostatic atomizer therein includes a condensation space in which the atomizing electrode is disposed to produce condensate water; a cooling space in which the cooling section of the cooling cycle is disposed to produce cold air; and a partition wall for separating the condensation space from the cooling space.

6 Claims, 8 Drawing Sheets

ELECTROSTATIC ATOMIZER AND COOLANT-CIRCULATING EQUIPMENT INCLUDING SAME

FIELD OF THE INVENTION

The present invention relates to an electrostatic atomizer for producing electrically charged water particles using an electrostatic atomization phenomenon.

BACKGROUND OF THE INVENTION

Conventionally, there has been known an electrostatic atomizer in which high voltage is applied to an atomizing electrode to atomize water held on the atomizing electrode so as to generate electrically charged water particles having a nanometer size and carrying a large number of electric charges. The charged water particles having a nanometer size has not only a moisturizing effect, but also a deodorizing effect, a disinfecting effect on molds and bacteria, and a suppressive effect on the propagation thereof, since active species exist therein in a state of being wrapped with water molecules. Further, the charged water particles having a nanometer size exhibit a longer life span as compared with active species existing independently in the form of free radicals, and is as small as a nanometer in size and thereby exhibits high floatability in air for a long period of time and high dispersive performance. Thus, the charged water particles has a feature of being able to drift evenly and over a wide area of air for a long period of time so as to provide an enhanced deodorizing effect.

In the conventional electrostatic atomizer, a water supplier includes a water tank containing water and a water transfer section for transferring water from the water tank to the atomizing electrode using a capillary phenomenon. This type of water supplier requires a user to refill the water tank with water on a regular basis, undesirably causing a problem in which a user is obliged to spend time and effort for the cumbersome water-refilling operation. Also, in the conventional electrostatic atomizer, in the case where water containing impurities such as Ca or Mg, for example tap water, is used as the supply water, such impurities entail a problem in that they react with $CO_2$ in air, thus causing deposits of $CaCO_3$ or MgO on a leading portion of the water transfer section, undesirably obstructing the supply of water based on a capillary phenomenon.

In order to solve the above problems, Japanese Patent Laid-open Publication No. 2006-68711 discloses an electrostatic atomizer using a Peltier unit having a cooling part connected to an atomizing electrode to cool the atomizing electrode and induce the condensation of moisture in air, in order to supply water to the atomizing electrode. This electrostatic atomizer has a feature of being able to eliminate the need for the aforementioned water-refilling operation, and avoid the deposits of $CaCO_3$ or MgO, because no impurities are contained in water obtained through the condensation.

However, the electrostatic atomizer as disclosed above includes the Peltier unit as the cooler for obtaining condensate water and requires power supply for the operation of such a Peltier unit. As such, power required to attain predetermined cooling capacity using the Peltier unit is greater than power necessary for obtaining predetermined cooling capacity using a cooling cycle which circulates a coolant. In addition, in the case where the electrostatic atomizer as disclosed above is implemented within various instruments, the use of the Peltier unit as the cooler makes it difficult to reduce the total size of the instrument and realize low costs and an energy-saving effect.

SUMMARY OF THE INVENTION

The present invention provides an electrostatic atomizer capable of producing electrically charged water particles using condensate water, whereby the total size of an equipment including the electrostatic atomizer can be reduced and low costs and energy-saving effects can be realized.

In accordance with an aspect of the present invention, there is provided an electrostatic atomizer including: an atomizing electrode to which a high voltage is applied to atomize water held on the atomizing electrode so as to generate charged water particles; and a cooling unit for producing water, to be supplied to the atomizing electrode, through condensation, the cooling unit being made using a cooling part of a cooling cycle which circulates a coolant between a heat-radiating part and the cooling part.

In this way, when the condensate water is obtained using the cooling cycle, power consumption may be further reduced than when condensate water is generated using a Peltier unit. Further, in the case where various equipments (e.g., refrigerators, dehumidifiers, air conditioners, etc.) incorporating therein the electrostatic atomizer are provided, the cooling unit for producing condensate water may be made using the cooling part of the cooling cycle provided in the equipment to exhibit an intrinsic function thereof. Accordingly, the condensate water can be produced by using the components of the cooling cycle essentially provided in the equipment and a portion of the cooling capacity, without using a dedicated device such as a Peltier unit as the cooling unit and a power supply to operate the Peltier unit, thus making it possible to reduce the total size of the equipment incorporating the electrostatic atomizer therein and to realize low costs and energy-saving effects.

In accordance with another aspect of the present invention, there is provided a coolant-circulating equipment including: the electrostatic atomizer as set forth above; a condensation space in which the atomizing electrode is disposed to produce condensate water; a cooling space in which the cooling section of the cooling cycle is disposed to produce cold air; and a partition wall for separating the condensation space from the cooling space.

In this way, by separating the condensation space from the cooling space by the partition wall, the condensation space can be maintained under higher temperature and absolute humidity conditions compared to the cooling space, that is, in a state of facilitating the formation of the condensate water on the atomizing electrode.

In addition, the coolant-circulating equipment may further include an air flow passage for guiding air heated by the heat-radiating part of the cooling cycle into the condensation space. In this way, an area of the condensation space can be maintained under higher temperature and absolute humidity conditions, that is, in a state which facilitates the formation of the condensate water on the atomizing electrode.

Alternatively, the heat-radiating part of the cooling cycle or a heat transfer member connected to the heat-radiating part may be disposed in the condensation space. In this way, an area of the condensation space may be maintained under higher temperature and absolute humidity conditions, that is, in a state which facilitates the formation of the condensate water on the atomizing electrode.

In accordance with the present invention, in the electrostatic atomizer, condensate water can be obtained by the cooling unit, so that it is possible to produce electrically charged water particles without using a water-refilling operation and without deposits of $CaCo_3$ or $MgO$. Further, the cooling unit can be made using the cooling part of the cooling cycle, thereby reducing power consumption. Also, the total size of the coolant-circulating equipment incorporating therein the electrostatic atomizer can be reduced and low costs and energy-saving effects can be realized.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Figure 1:
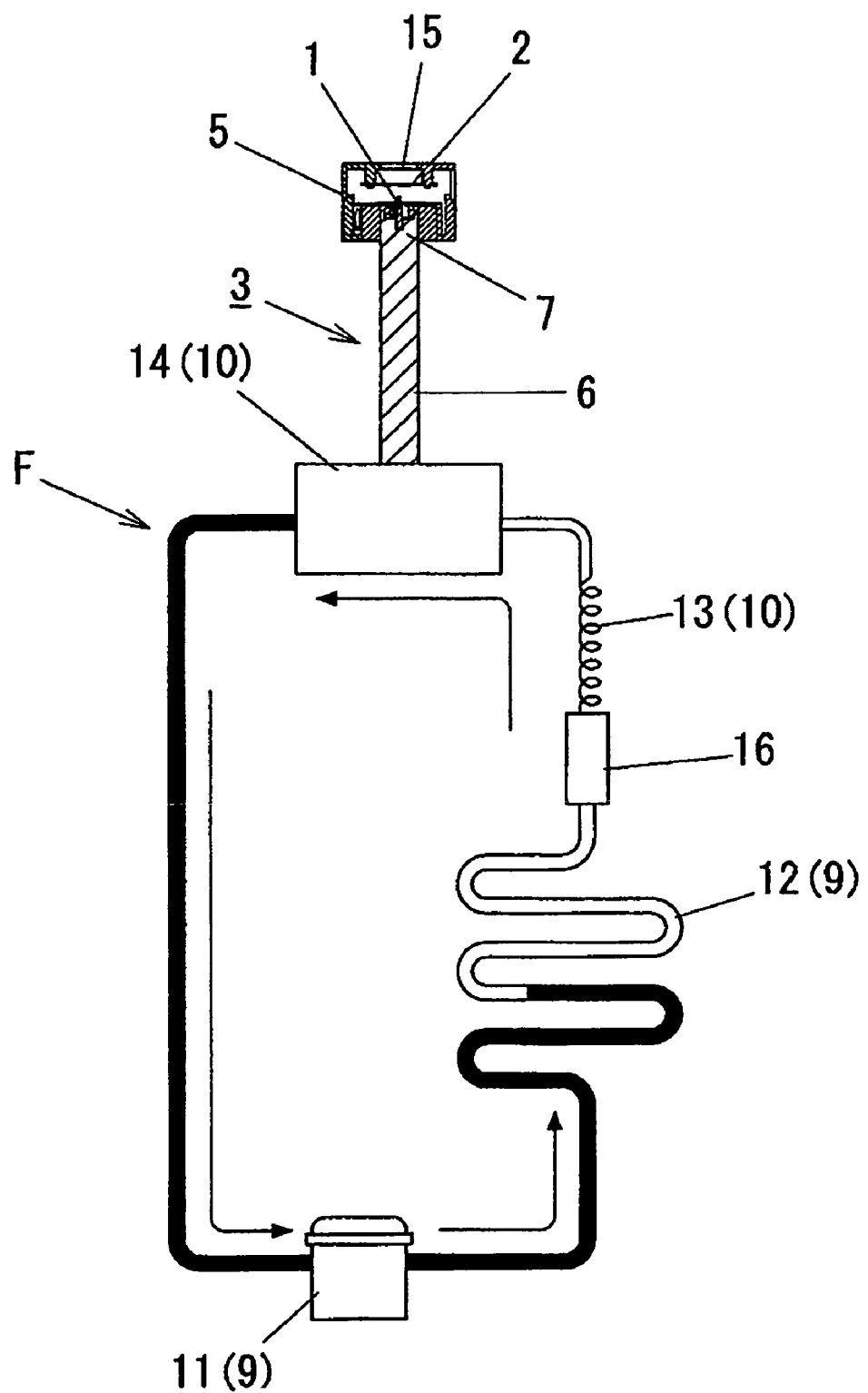
FIG. 1 is a cross-sectional view showing an electrostatic atomizer in accordance with an embodiment of the present invention.
Figure 2:
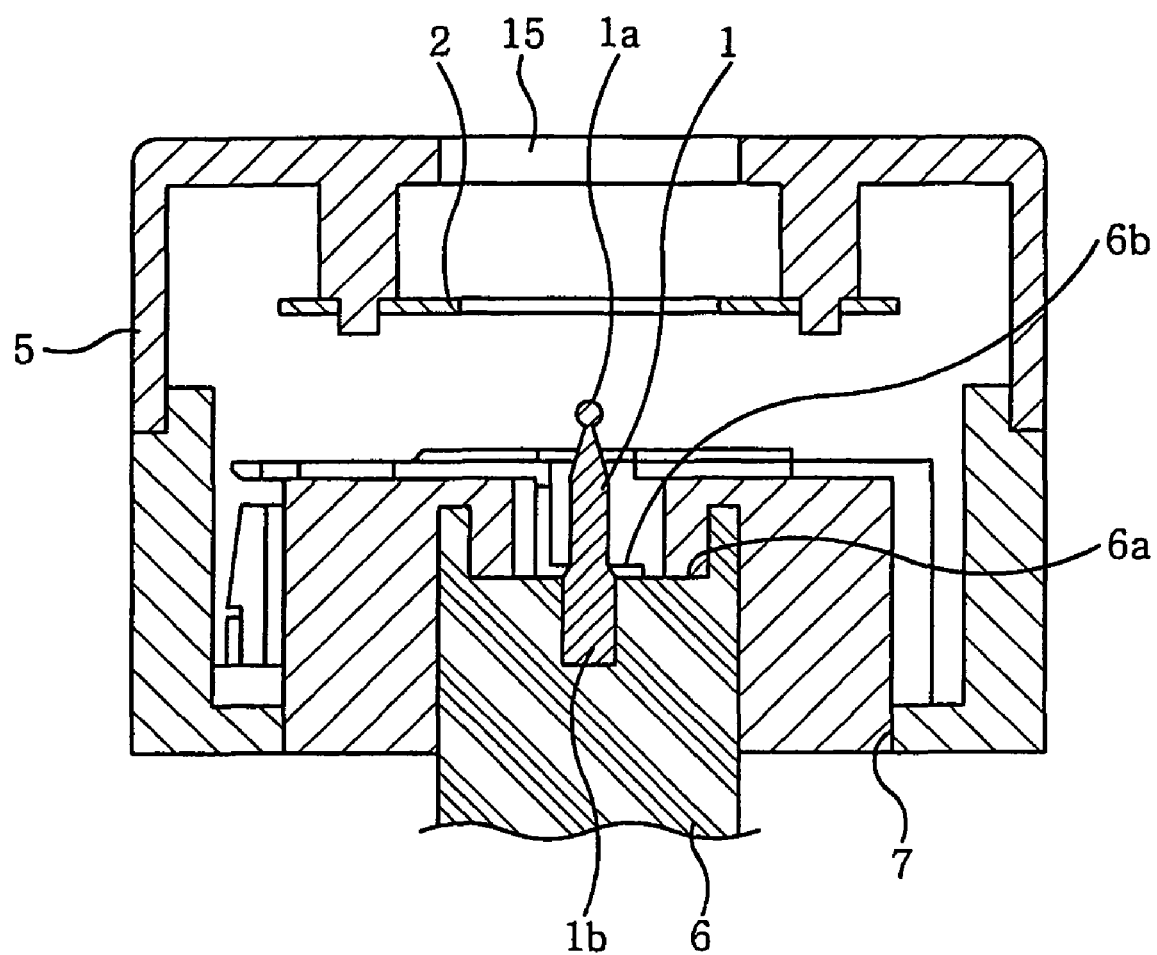
FIG. 2 is an enlarged view showing the main components of the electrostatic atomizer in accordance with the embodiment of the present invention.

Hereinafter, a detailed description will be given of embodiments of the present invention with reference to the accompanying drawings. FIGS. 1 and 2 schematically show an electrostatic atomizer in accordance with an embodiment of the present invention.

The electrostatic atomizer in accordance with the present embodiment includes an atomizing electrode 1, a counter electrode 2 located to face the atomizing electrode 1, a cooling unit 3 for producing condensate water on the atomizing electrode 1 by condensing moisture in the air, a high voltage applying unit (not shown) for applying high voltage between the atomizing electrode 1 and the counter electrode 2, a control unit (not shown) for controlling the operation of electrostatic atomization, and an atomizer housing 5 receiving therein the above components. When high voltage is applied between the atomizing electrode 1 and the counter electrode 2 using the high voltage applying unit, water held on the atomizing electrode 1 through condensation is atomized, thus producing charged water particles having a nanometer size and carrying a large number of electric charges. Below the electrostatic atomizer is more specifically described.

The counter electrode 2 is provided in the form of a doughnut-shaped metal plate, and is mounted in the front side of the inner space of the atomizer housing 5 to face a discharge opening 15 formed in a front wall of the atomizer housing 5. The atomizing electrode 1 is mounted in the rear side of the inner space of the atomizer housing 5. The atomizing electrode 1 is positioned such that a leading end portion 1*a* thereof is located coaxially with the center of a center hole of the doughnut-shaped counter electrode 2. Each of the atomizing electrode 1 and the counter electrode 2 is electrically connected to the high voltage applying unit through a high-voltage lead wire (not shown).

To a base end portion 1*b* of the atomizing electrode 1 is connected a heat transfer member 6 made of a material having high thermal conductivity such as a metal. The atomizing electrode 1 and the heat transfer member 6 may be integrally formed as a single piece. Alternatively, the heat transfer member 6 may be formed separately from the atomizing electrode 1 and then fixedly attached to the atomizing electrode 1, or the heat transfer member 6 may be formed separately from the atomizing electrode 1 and then brought into contact with the atomizing electrode 1. In either case, the atomizing electrode 1 and the heat transfer member 6 are formed in a structure which allows heat to be efficiently transferred therebetween.

As shown in FIGS. 1 and 2, the heat transfer member 6 made of metal and formed in a columnar shape has in its front surface a recess 6*a* and a fitting hole 6*b* is formed in the bottom surface of the recess 6*a*. The base end portion 1*b* of the atomizing electrode 1 formed in a rod shape is fitted into the fitting hole 6*b*, and thereby the inner surface of the fitting hole 6*b* is brought into contact with the base end portion 1*b* of the atomizing electrode 1, thus effectively realizing thermal conduction therebetween. The rear wall of the atomizer housing 5 is formed with an opening 7, and the heat transfer member 6 is extended through the opening 7 to protrude rearwards. In the opening 7 of the atomizer housing 5, a heater (not shown) is disposed to surround the heat transfer member 6.

The rear end of the columnar heat transfer member 6 is brought into contact with the cooling part 10 of a cooling cycle F which circulates a coolant between the heat-radiating part 9 and the cooling part 10, thus thermally connecting the heat transfer member 6 with the cooling part 10. In the present embodiment, the atomizing electrode 1 is cooled by means of the cooling part 10 via the heat transfer member 6. The cooling part 10 and the heat transfer member 6 constitute the cooling unit 3 for cooling the atomizing electrode 1 to produce condensate water.

The cooling cycle F includes a compressor 11 for compressing a coolant gas under conditions of high temperature and high pressure, a condenser 12 having a heat exchanger for converting the coolant gas in the high-temperature and high-pressure state into a coolant liquid through cooling (heat radiation), a dryer 16 for drying the coolant liquid, an expansion valve 13 for decompressing the coolant liquid to facilitate the evaporation thereof, and an evaporator 14 having a heat exchanger for evaporating the decompressed coolant liquid to convert it again into the coolant gas, which are sequentially disposed in a coolant circuit that circulates the coolant. Accordingly, while circulating, the coolant radiates heat in the compressor 11 and the condenser 12 and absorbs heat in the expansion valve 13 and the evaporator 14.

Thus, the compressor 11 and the condenser 12 constitutes the heat-radiating part 9, and the expansion valve 13 and the evaporator 14 forms the cooling part 10. The rear end of the heat transfer member 6 is brought into contact with the evaporator 14 constituting the cooling part 10.

In the electrostatic atomizer thus constructed, when the coolant is circulated through the cooling cycle F, the evaporator 14 is cooled, and thereby the temperature of the atomizing electrode 1 is lowered due to heat exchange through the heat transfer member 6. When the temperature of the atomizing electrode 1 is lowered, air in the atomizer housing 5 is cooled, so that moisture contained in the corresponding air is condensed to producing condensate water on the atomizing electrode 1. In this way, water is continuously supplied to the atomizing electrode 1.

As a configuration in which condensate water is produced by means of the cooling unit 3 to be supplied to the atomizing electrode 1, the present invention is not limited to the configuration in which the atomizing electrode 1 is cooled and condensate water is produced directly on the atomizing electrode 1. For example, there may be provided a separate cooled surface that is thermally connected to the cooling unit 3 to be cooled, and condensate water produced on the cooling surface is transferred to the atomizing electrode.

In this way, in a state in which water is stably supplied to the atomizing electrode 1, when high voltage is applied between the atomizing electrode 1 and the counter electrode 2 by the high voltage applying unit, Coulomb force acts between the water supplied onto the leading end portion 1a of the atomizing electrode 1 and the counter electrode 2 by the high voltage applied between the atomizing electrode 1 and the counter electrode 2, so that the level of the water locally swells in the shape of a needle having a pointed leading end (called a "Taylor cone") Electric charges are concentrated on the leading end of the Taylor cone, and thus become densified, so that electric field intensity and Coulomb's force therearound are increased and the Taylor cone grows. The water around the leading end of Taylor cone receives great energy (repulsive force of the densified charges) and is repeatedly segmented and scattered (called Rayleigh scattering), thereby generating a large number of charged water particles of nanometer size.

The charged water particles thus produced are discharged through the center hole of the counter electrode 2 and the discharge opening 15 of the atomizer housing 5 into a target space outside the atomizer housing 5.

The charged water particles discharged into the target space are as small as a nanometer in size to thus exhibit high floatability in air for a long period of time and high dispersive performance, so that they drift evenly and over a wide area of the target space and is attached to the wall surface of the target space or any object therein. Also, the charged water particles in which active species exist in a state of being wrapped with water molecules have a deodorizing effect, an allergen inactivation effect, a disinfecting effect on molds and bacteria, and a suppressive effect on propagation thereof. The charged water particles exhibit the deodorizing effect, the allergen inactivation effect, the disinfecting effect on molds and bacteria, and the suppressive effect on propagation thereof when attached to the wall of the target space or any object therein. Moreover, because the charged water particles exhibit a longer life span as compared with active species existing independently in the form of free radicals, dispersive performance, the deodorizing effect, the allergen inactivation effect, the disinfecting effect on molds and bacteria, and the suppressive effect on propagation thereof can be further enhanced.

In the above electrostatic atomizer, the condensate water is produced by using the cooling part 10 of the cooling cycle F and is then stably supplied to the atomizing electrode 1, thus eliminating the need for a water-refilling operation. Further, because the water thus obtained contains no impurities, there is no deposit of $CaCO_3$ or $MgO$. When the condensate water is obtained by using the cooling cycle F, power consumption can be reduced compared to when for example a Peltier unit is used.

In various equipments (refrigerators, dehumidifiers, air conditioner, etc.) including the electrostatic atomizer, when the electrostatic atomizer employs the Peltier unit as the cooling unit 3, the Peltier unit is used as a dedicated device and a power supply for the operation of the Peltier unit is required, thereby undesirably negating the desired benefits which include a reduction in the total size of the equipment, low costs and energy-saving effects. However, when the electrostatic atomizer in accordance with the present embodiment is employed, the cooling unit 3 for producing condensate water can be constructed by a part of the cooling cycle F in the various equipments that is provided to exhibit intrinsic functions thereof. Hence, without requiring the dedicated device as the cooling unit 3 and the additional power supply therefor, condensate water can be produced by using the components of the cooling cycle F essentially included in the equipment and a part of cooling capacity thereof, thereby realizing the reduction in the total size of the instrument, low costs and energy-saving effects.

In other embodiments which will be described below, there are described cases where the electrostatic atomizer described above is incorporated in various equipments (hereinafter referred to as "coolant-circulating equipments") each essentially including a cooling cycle F that circulates a coolant. Specifically, each of the coolant-circulating equipments plays a role in cooling air through the cooling part 10 of the cooling cycle F which circulates the coolant between the heat-radiating part 9 and the cooling part 10. The coolant-circulating equipment incorporates therein the electrostatic atomizer including the atomizing electrode 1 and the cooling unit 3 for producing water on the atomizing electrode 1 by cooling the atomizing electrode 1 to condense moisture in the air wherein high voltage is applied to the atomizing electrode 1 to atomize water held on the atomizing electrode 1 so as to generate charged water particles. The cooling part 10 of the cooling cycle F is used as the cooling unit 3 of the electrostatic atomizer.

Figure 3:
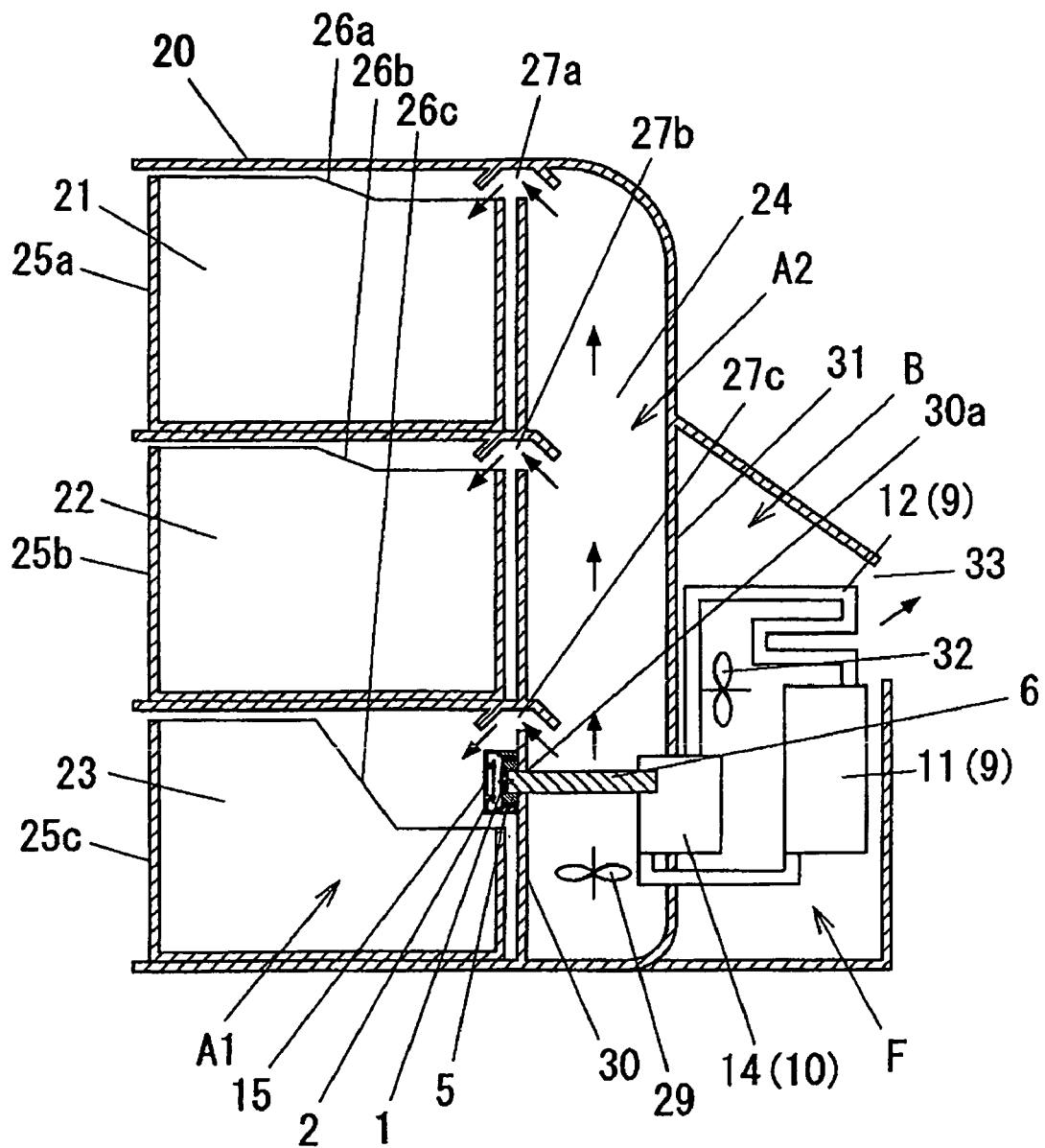
FIG. 3 is a cross-sectional view showing a refrigerator incorporating the electrostatic atomizer therein.
Figure 4:
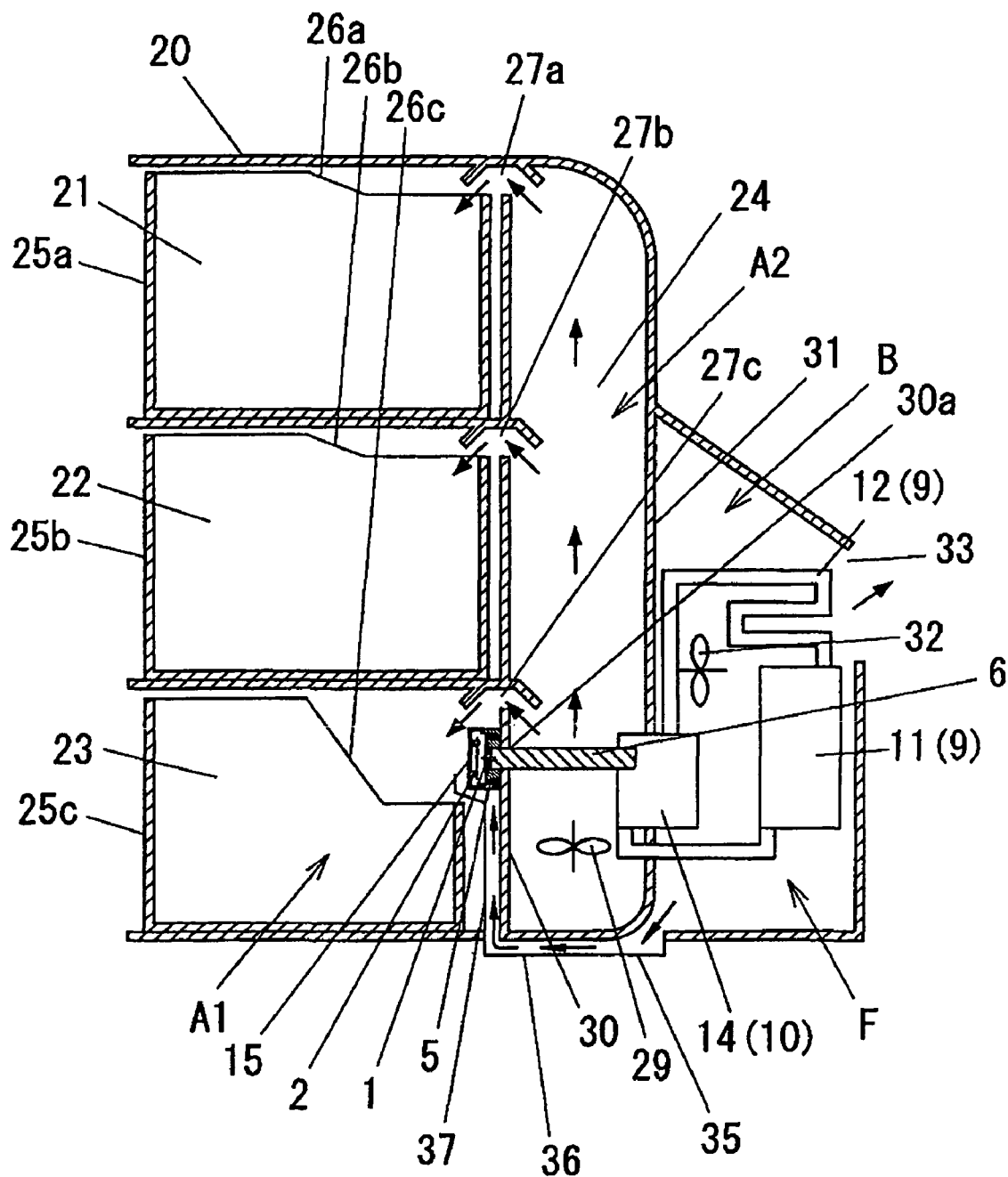
FIG. 4 is a cross-sectional view showing a modification of the refrigerator shown in FIG. 3.

FIG. 3 shows a coolant-circulating equipment, for example, a refrigerator, incorporating therein the above electrostatic atomizer, in accordance with an embodiment of the present invention. As shown in FIG. 3, a refrigerator body 20 includes a freezing compartment 21, a refrigerating compartment 22, and a vegetable compartment 23, which function to cool food stored therein, and a cold-air passage 24 communicating with the respective compartments 21, 22, 23. In the refrigerator body 20, each of the freezing compartment 21, the refrigerating compartment 22, the vegetable compartment 23, and the cold-air passage 24 is partitioned by a partition wall 30 made of a heat-insulating material. The partition wall 30 separates the cold-air passage 24 from each of the freezing compartment 21, the refrigerating compartment 22 and the vegetable compartment 23, and is provided with communication holes 27a, 27b, 27c which allow the cold-air passage 24 to communicate with the freezing compartment 21, the refrigerating compartment 22, and the vegetable compartment 23, respectively.

Drawer-type boxes 26a, 26b, 26c are slidably inserted in the freezing compartment 21, the refrigerating compartment 22 and the vegetable compartment 23, respectively. The drawer-type boxes 26a, 26b, 26c are integrally formed with doors 25a, 25b, 25c at respective front ends thereof. When the respective drawer-type boxes 26a, 26b, 26c are fully inserted into the freezing compartment 21, the refrigerating compartment 22 and the vegetable compartment 23, the front openings of the compartments are closed by the respective doors 25a, 25b, 25c of the drawer-type boxes 26a, 26b, 26c.

Provided in the cold-air passage 24 is the cooling part 10 including the evaporator 14 of the cooling cycle F and a fan 29 for blowing cold air. The cooling part 10 functions to cool air in the cold-air passage 24 down to about −20° C., and the fan 29 functions to supply the cold air in the cold-air passage 24 into the freezing compartment 21, the refrigerating compartment 22 and the vegetable compartment 23 through the respective communication holes 27a, 27b, 27c. Accordingly, each of the freezing compartment 21, the refrigerating compartment 22 and the vegetable compartment 23 is set at a desired temperature due to the cold air supplied thereto. Typically, the desired temperature of either the refrigerating compartment 22 or the vegetable compartment 23 is higher than the desired temperature of the freezing compartment 21, and thus, the communication holes 27b, 27c are formed to have an opening area less than that of the communication hole 27a so as to allow a smaller amount of cold air to be respectively introduced into the refrigerating compartment 22 and the vegetable compartment 23 from the cold-air passage 24, as compared with the freezing compartment 21. Although not shown, there is provided a return passage for returning air from each of the freezing compartment 21, the refrigerating compartment 22 and the vegetable compartment 23 to the cooling part 10 of the cold-air passage 24.

The other parts of the cooling cycle F than the evaporator 14 constituting the cooling part 10 are disposed in a receiving space B provided in the rear side of the refrigerator body 20. The receiving space B in which the heat-radiating part 9 of the cooling cycle F is located is separated from a cooling space A2 in which the cooling part 10 is located, by means of a partition wall 31 made of a heat-insulating material. Provided inside the receiving space B is a fan 32 for blowing air so that heat generated from the heat-radiating part 9 is discharged to the outside of the refrigerator through an air vent 33 provided at the rear surface of the refrigerator body 20. The expansion valve 13 and the dryer 16 of the cooling cycle F are not shown.

In the refrigerator thus constructed, the storage compartment such as the vegetable compartment 23 is used as a condensation space A1, and the cold-air passage 24 partitioned adjacent thereto by the partition wall 30 made of heat-insulating material is used as the cooling space A2 having a temperature lower than that of the condensation space A1. In the illustrated embodiment, only the vegetable compartment 23 is defined as the condensation space A1. In the present invention, the cooling space A2 is a region at 0° C. or less. For instance, in the case where the cooling space A2 is constituted by the cold-air passage 24 of the refrigerator as in the present embodiment, the temperature of the cooling space A2 may be set at about −20° C.

The atomizer housing 5 of the electrostatic atomizer is mounted to the surface of the partition wall 30 which separates the vegetable compartment 23 corresponding to the condensation space A1 from the cold-air passage 24 corresponding to the cooling space A2, on the side of the condensation space A1. The rear portion of the heat transfer member 6 which extends rearwards from the atomizer housing 5 is inserted through a through hole 30a formed in the partition wall 30 into the cooling space A2. The rear end of the heat transfer member 6 is brought into contact with the cooling part 10 of the cooling cycle F which circulates the coolant between the heat-radiating part 9 and the cooling part 10, thus thermally connecting the heat transfer member 6 to the cooling part 10 in the cooling space A2.

Thus, the rear portion of the heat transfer member 6 is cooled by the cooling part 10 in the cooling space A2, so that the atomizing electrode 1 located near the condensation space A1 is cooled. In this case, the atomizing electrode 1 is certainly cooled to 0° C. or less, so that moisture in air around the atomizing electrode 1 (moisture in the air in the condensation space A1 at 0° C. or higher) is frozen and thus attached to the atomizing electrode 1. Alternatively, the heat transfer member 6 may not be in contact with the cooling part 10, and the exposed portion of the heat transfer member 6 may be cooled via the cooling space A2 which is to be cooled by the cooling part 10.

Although not shown, the heater provided adjacent to the atomizing electrode 1 or the heat transfer member 6 in the electrostatic atomizer in accordance with the present embodiment functions as a melting unit. The control unit controls a timing of supplying a current to the heater, a time period of the current supply to the heater, a timing of applying a high voltage between the atomizing electrode 1 and the counter electrode 2, a timing of stopping the high-voltage application, etc.

Specifically, under the condition that the atomizing electrode 1 be continuously cooled by the cooling unit 3, the control unit controls the current supply to the heater and the high-voltage application in such a manner that a freezing mode in which no current is supplied to the heater and no high-voltage is applied, a melting mode in which a current is supplied to the heat after the freezing mode (without the high-voltage application), and an electrostatic atomization mode in which high-voltage is applied after the melting mode (while continuing the current supply to the heater) are repeated in sequence.

In the freezing mode, the heat transfer member 6 is cooled in the cooling space A2, so that the atomizing electrode 1 is cooled down to an intended temperature of 0° C. or lower (at which moisture in the air of the condensation space A1 is frozen into ice). Accordingly, moisture in air of the condensation space A1 is frozen and attached onto the atomizing electrode 1 in the form of ice. After completion of the freezing mode, the melting mode is performed so that a current is supplied to the heater to melt the ice frozen on the atomizing electrode 1 into water. Then, if the melting mode is terminated, the electrostatic atomization mode is started to apply a high voltage between the atomizing electrode 1 and the counter electrode 2, while continuing the current supply to the heater. As a result, a large amount of charged water particles having a nanometer size are generated, and water supplied onto the leading end portion 1a of the atomizing electrode 1 is gradually reduced. Then, at the time when the water is exhausted, the high-voltage application and the current supply to the heater are stopped to terminate the electrostatic atomization mode. After the termination of the electrostatic atomization mode, the freezing mode is restarted. Subsequently, the freezing mode for ice attachment, the melting mode for water supply and the electrostatic atomization mode are repeatedly performed in the same order and manner as those described above.

The charged water particles thus produced are discharged through the center hole of the counter electrode 2 and the discharge opening 15 provided in the front wall of the atomizer housing 5, into the vegetable compartment 23 corresponding to the condensation space A1. Because the charged water particles discharged into the vegetable compartment 23 are as small as a nanometer in size to thus exhibit high floatability in air for a long period of time and high dispersive performance, they drift evenly and over a wide area in the vegetable compartment 23 and becomes attached to the inner surface of the vegetable compartment 23 or any object received in the vegetable compartment 23.

The charged water particles attached to the inner surface of the vegetable compartment 23 or any object therein exhibit a deodorizing effect, a disinfecting effect on molds and bacteria, and a suppressive effect on the propagation thereof.

The charged water particles in which active species exist in a state of being wrapped with water molecules exhibit a longer life span as compared with active species existing independently in the form of free radicals, thus further enhancing dispersive performance, a deodorizing effect, a disinfecting effect on molds and bacteria, and a suppressive effect on propagation thereof. The charged water particles having a moisturizing effect functions to moisturize any object received in the condensation space A1.

The refrigerator having the electrostatic atomizer as described above adopts the cooling cycle F provided in the refrigerator body 20 to exhibit an intrinsic cooling function of the refrigerator, and utilizes a portion of cooling capacity of the cooling part 10 of the cooling cycle F to produce the condensate water. Specifically, by using the components of the cooling cycle F intrinsically provided in the refrigerator, the condensate water can be stably supplied, without a dedicated cooling device such as a Peltier unit for producing the condensate water to be supplied to the atomizing electrode 1, and without a power supply for operating the Peltier unit. Accordingly, the total size of the refrigerator having the electrostatic atomizer can be reduced and low costs and energy-saving effects can be realized.

The condensation space A1 (corresponding to the vegetable compartment 23 in the illustrated embodiment) having the atomizing electrode 1 located therein to produce the condensate water and the cooling space A2 (corresponding to the cold-air passage 24 in the illustrated embodiment) having the cooling part 10 of the cooling cycle F located therein to produce cold air are separated from each other by the heat-insulation partition wall 30, thus making it possible to maintain the condensation space A1 under higher temperature and absolute humidity conditions compared to the cooling space A2 and to maintain the condensation space A1 in a state which facilitates the generation of condensate water on the atomizing electrode 1.

Further, in the refrigerator, the atomizing electrode 1 and the counter electrode 2 of the electrostatic atomizer are disposed in the storage compartment (which is the vegetable compartment 23) located downstream of the cooling part 10 and the fan 29, so that the charged water particles produced from the atomizing electrode 1 can be efficiently sprayed into the storage compartment along with the cold air, without contacting with the cooling part 10 including the evaporator 14 or the fan 29.

FIG. 4 shows a modification of the coolant-circulating equipment, i.e., the refrigerator as described above. In this modification, the same reference numerals refer to the same or similar elements as in the embodiment of FIG. 3, and redundant descriptions will be omitted. Only different constructions from those of the embodiment of FIG. 3 will be described.

In accordance with this modification, there is provided an air flow passage 35 for guiding a portion of hot air heated by the heat-radiating part 9 of the cooling cycle F toward the atomizing electrode 1 in the vegetable compartment 23 corresponding to the condensation space A1. Thus, it is possible to maintain the area of the condensation space A1 near the atomizing electrode 1 under higher temperature and absolute humidity conditions compared to the other area of the condensation space A1, that is, in a state which facilitates the production of condensate water on the atomizing electrode 1. Most of the air heated by the heat-radiating part 9 is discharged to the outside of the refrigerator through the air vent 33.

The air flow passage 35 includes a high-temperature bypass 36 which allows the receiving space B in which the heat-radiating part 9 is disposed to communicate with the condensation space A1 while bypassing the cooling space A2, and a guide passage 37 for guiding the air transferred along the high-temperature bypass 36 to the atomizer housing 5 (near the atomizing electrode 1) along the inner wall of the condensation space. A1. The guide passage 37 of the air flow passage 35 is provided at the rear end of the vegetable compartment 23 so as not to come into contact with the drawer-type box 26*c*, whereby the transferred hot air is supplied to the discharge opening 15 of the atomizer housing 5, without the direct contact with the drawer-type box 26*a*.

In this case, the amount of the hot air supplied into the condensation space A1 through the air flow passage 35 is set to be sufficiently smaller than the amount of the cold air which is supplied into the condensation space A1 via the communication hole 27*c* so as not to affect the cooling capacity of the refrigerator for cooling the condensation space A1. The hot air transferred along the air flow passage 35 is supplied near the atomizing electrode 1 through the discharge opening 15 of the atomizer housing 5, and is then combined with the cold air supplied through the communication hole 27*c*. As mentioned above, because the amount of the hot air is smaller than the amount of the cold air, the combined air, which exhibits adequate cooling capacity, is uniformly supplied into the vegetable compartment 23 being used as a storage compartment.

Although not shown, instead of supplying external hot air to the condensation space A1 through the air flow passage 35, there may be used either the heat-radiating part 9 of the cooling cycle F at least a portion of which is located adjacent to the atomizer housing 5 (near the atomizing electrode 1) of the condensation space A1 or a heat transfer member a portion of which is connected to the heat-radiating part 9 and another portion of which is disposed near the atomizer housing 5 in the condensation space A1. In this case, the area near the atomizing electrode 1 in the condensation space A1 may be directly warmed by the heat-radiating part 9 or the heat transfer member, and thus may be maintained under higher temperature and absolute humidity conditions compared to the other area of the condensation space A1, that is, in a state which facilitates the formation of the condensate water on the atomizing electrode 1. The heat value required for warming the condensation space A1 by using the heat-radiating part 9 is set at a level that does not affect the cooling capacity of the refrigerator for cooling the condensation space A1.

FIG. 5 shows a case where the aforementioned electrostatic atomizer is incorporated in another coolant-circulating equipment, i.e., a dehumidifier. As shown in FIG. 5, the dehumidifier includes a dehumidifying passage 40 both ends of which respectively have a suction inlet 41 and a discharge outlet 42. The discharge outlet 42 is provided with louvers 43. Further, a dehumidifying unit 44 and an air blower 45 are provided in the dehumidifying passage 40.

As shown in FIG. 5, a dehumidifying chamber 46 is provided in the dehumidifying passage 40. Provided in the dehumidifying chamber 46 are a compressor 11 and a condenser 12 constituting the heat-radiating part 9 of the cooling cycle F, and an evaporator 14 constituting the cooling part 10, which constitute the dehumidifying unit 44. A water drain port 47 is provided in a bottom of the dehumidifying chamber 46. Also, a water tank 48 is provided at the lower portion of the dehumidifier to collect water flowing out of the water drain port 47 formed in the bottom of the dehumidifying chamber 46. The expansion valve 13 and the dryer 16 of the cooling cycle F are not shown.

An air blower receiving chamber 49 which receives a fan as the air blower 45 is provided downstream of the dehumidifying chamber 46 in the dehumidifying passage 40. The dehumidifying chamber 46 and the air blower receiving chamber 49 communicate with each other through a communication hole 50 formed in a downstream lower end portion of the dehumidifying chamber 46, so that dry air dehumidified in the dehumidifying chamber 46 flows into the air blower receiving chamber 49 through the communication hole 50.

The dehumidifier dehumidifies air in a target space C which is the outside atmosphere in a manner such that, when the air blower 45 is operated, the air is sucked into the dehumidifier through the suction inlet 41 and then dehumidified by the dehumidifying unit 44, thus obtaining dry air, which is then returned into the target space C through the discharge outlet 42.

In the dehumidifying unit 44, the wet air sucked through the suction inlet 41 is warmed through heat exchange with the heat-radiating part 9 of the cooling cycle F, and is then cooled in the cooling part 10, thus removing moisture in air in the form of condensate water, resulting in dry air. The water generated through the dehumidifying process is introduced into the water tank 48 through the water drain port 47 to be collected therein.

The dehumidifier thus constructed includes the aforementioned electrostatic atomizer therein to discharge the charged water particles to the dry air dehumidified by the dehumidifying unit 44. As mentioned above, the electrostatic atomizer includes the atomizing housing 5 having the atomizing electrode 1 therein and the heat transfer member 6 thermally connected to the atomizing electrode 1 in the atomizer housing 5, and the atomizer housing 5 is extended to penetrate through a partition wall 30 serving as a side wall of the dehumidifying passage 40.

The dehumidifying chamber 46 is provided on one side of the partition wall 30 and the cooling space A2 is formed around the cooling part 10 in the dehumidifying chamber 46. On the other side of the partition wall 30, the condensation space A1 is formed downstream of the dehumidifying chamber 46 and the air blower receiving chamber 49 of the dehumidifying passage 40. In the cooling space A2, the heat transfer member 6 of the electrostatic atomizer is exposed and thus brought into contact with the evaporator 14 corresponding to the cooling part 10. Further, the atomizing electrode 1 and the counter electrode 2 in the atomizer housing 5 are located in the condensation space A1. Also, the heat transfer member 6 may not be brought into contact with the cooling part 10, and the exposed portion of the heat transfer member 6 may be cooled through the cooling space A2 which is cooled by the cooling part 10.

When the dehumidifier thus constructed is operated, the evaporator 14 corresponding to the cooling part 10 of the cooling cycle F is cooled in the cooling space A2, and thus the temperature of the atomizing electrode 1 in the condensation space A1 is lowered due to heat exchange through the heat transfer member 6. If the temperature of the atomizing electrode 1 is lowered, air in the atomizer housing 5 is cooled, so that moisture contained in air is condensed to produce condensate water on the atomizing electrode 1. In this way, water can be stably supplied to the atomizing electrode 1. Then, high voltage is applied between the atomizing electrode 1 and the counter electrode 2, thereby generating a large amount of charged water particles having a nanometer size.

The charged water particles thus generated are discharged through the center hole of the counter electrode 2 and the discharge opening 15 formed in the atomizing housing 5, into the condensation space A1 located downstream of the dehumidifying unit 44 and the air blower 45 in the dehumidifying passage 40. The charged water particles discharged from the dehumidifying passage 40 are discharged into the target space C through the discharge outlet 42, along with the dry air which is transferred by the air blower 45.

Because the charged water particles discharged into the target space C are as small as a nanometer in size to thus exhibit high floatability in air for a long period of time and high dispersive performance, they drift evenly and over a wide area in the target space C and become attached to the inner surface of the dehumidifying space C, any object and/or a human body in the target space C. The charged water particles attached to the inner surface of the target space C and/or any object received therein exhibit a deodorizing effect, a disinfecting effect on molds and bacteria, and a suppressive effect on the propagation thereof.

The charged water particles in which active species exist in a state of being wrapped with water molecules exhibit a longer life span as compared with active species existing independently in the form of free radicals, so that dispersive performance, a deodorizing effect, a disinfecting effect on molds and bacteria, and a suppressive effect on the propagation thereof can be further enhanced. Also, the charged water particles having a moisturizing effect functions to moisturize any object and/or the skin of the human body in the target space C.

The dehumidifier incorporating the electrostatic atomizer therein utilizes the cooling cycle F provided in the dehumidifying chamber 46 to exhibit the intrinsic function of the dehumidifier, and uses a portion of cooling capacity of the cooling part 10 of the cooling cycle F to produce the condensate water. Specifically, by using the components of the cooling cycle F intrinsically provided in the dehumidifier, the condensate water can be stably supplied without a dedicated cooling device such as a Peltier unit for producing the condensate water to be supplied to the atomizing electrode 1, and without a power supply for operating the Peltier unit. Therefore, the total size of the dehumidifier incorporating the electrostatic atomizer therein can be reduced and low costs and energy-saving effects can be realized.

By separating the condensation space A1 (which is located downstream of the dehumidifying unit 44 and the air blower 45 in the dehumidifying passage 40 in the illustrated embodiment) in which the atomizing electrode 1 is provided to produce the condensate water from the cooling space A2 (around the cooling part 10 in the dehumidifying chamber 46) in which the cooling part 10 of the cooling cycle F is provided to produce cold air by the heat-insulation partition wall 30, the condensation space A1 can be maintained under higher temperature and absolute humidity conditions compared to the cooling space A2, that is, the condensation space A1 can be maintained in a state which facilitates the formation of the condensate water on the atomizing electrode 1.

Further, in such a dehumidifier, the atomizing electrode 1 and the counter electrode 2 of the electrostatic atomizer are disposed downstream of the dehumidifying unit 44 and the air blower 45, so that the charged water particles flowing in the dehumidifying passage 40 can be efficiently sprayed into the target space C along with the dry air, without contacting with the dehumidifying unit 44 including the heat-radiating part 9 and the cooling part 10 and with the air blower 45 including the fan.

Figure 5:
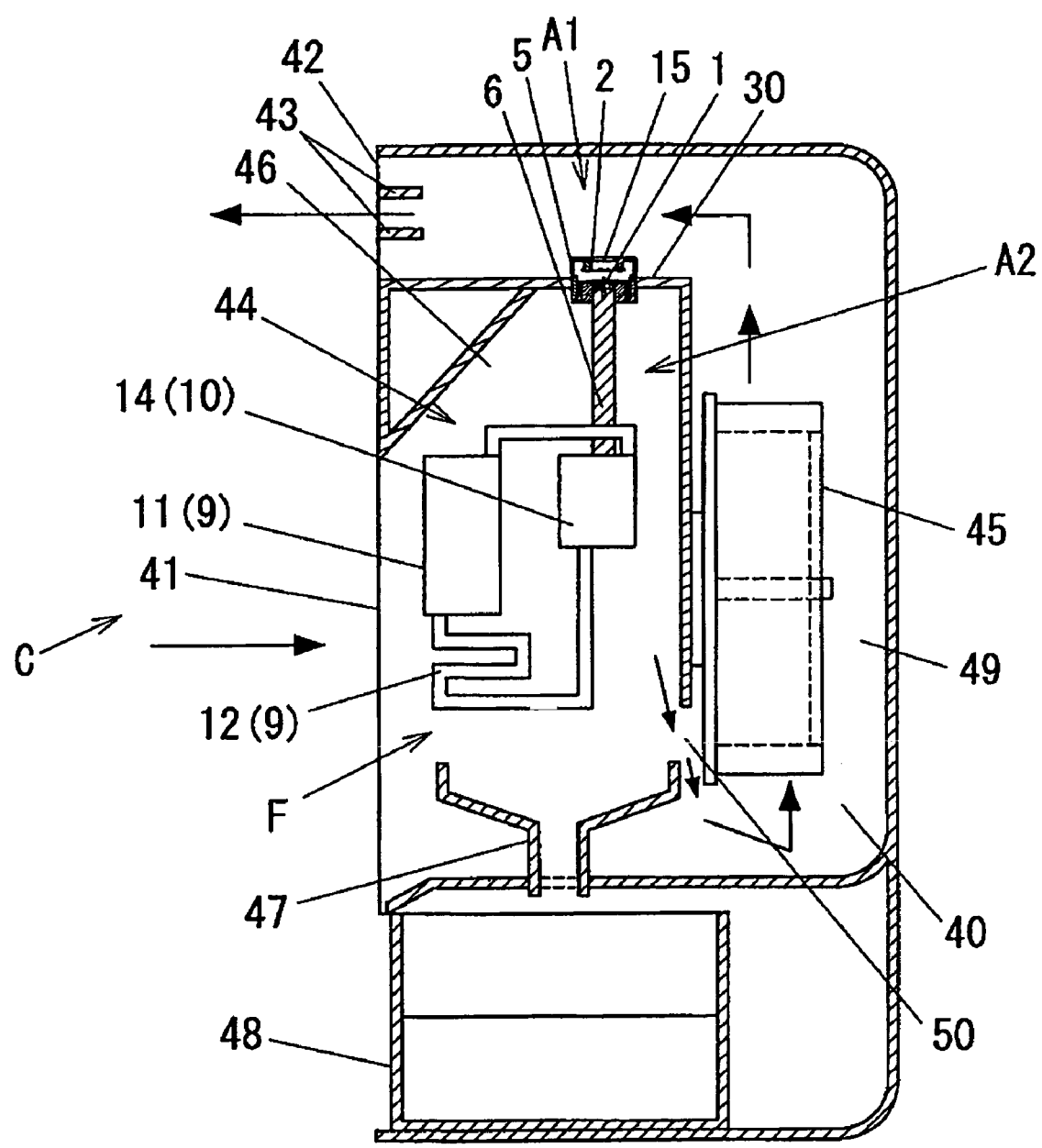
FIG. 5 is a cross-sectional view showing a dehumidifier incorporating the electrostatic atomizer therein.
Figure 6:
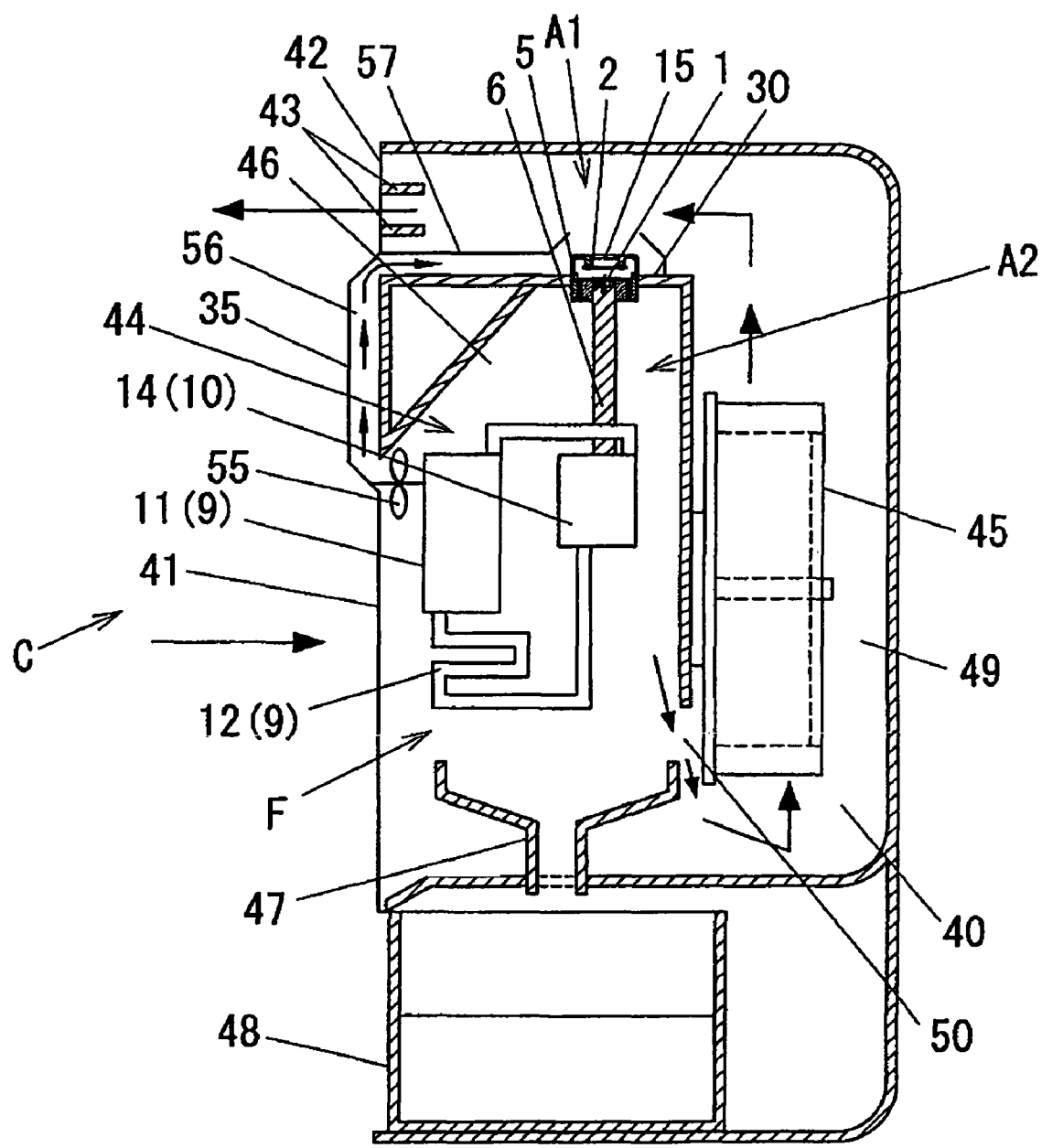
FIG. 6 is a cross-sectional view showing a modification of the dehumidifier shown in FIG. 5.

FIG. 6 shows a modification of the coolant-circulating equipment, i.e., the dehumidifier incorporating the electrostatic atomizer. In this modification, the same reference numerals refer to the same or similar elements as in the embodiment of FIG. 5, and redundant descriptions will be omitted. Only different configurations from those of the embodiment of FIG. 5 will be described.

In accordance with this modification, there is provided an air flow passage 35 for guiding a portion of hot air heated by the heat-radiating part 9 of the cooling cycle F in the dehumidifying chamber 46 near the atomizing electrode 1 in the condensation space A1 (which is located downstream of the dehumidifying unit 44 and the air blower 45 in the dehumidifying passage 40). Thus, an area of the condensation space A1 near the atomizing electrode 1 may be maintained under higher temperature and absolute humidity conditions compared to the other area of the condensation space A1, that is, in a state which facilitates the production of condensate water on the atomizing electrode 1. Provided in the dehumidifying chamber 46 is an air blowing fan 55 for transferring a portion of the hot air around the heat-radiating part 9 to the air flow passage 35 from the dehumidifying passage 40.

The air flow passage 35 includes a high-temperature bypass 56 which allows the area in the dehumidifying chamber 46 around the heat-radiating part 9 to communicate with and the condensation space A1, without passing the cooling space A2 around the cooling part 10 located downstream of the heat-radiating part 9 in the dehumidifying chamber 46, and a guide passage 57 for guiding the air transferred via the high-temperature bypass 56 to the atomizer housing 5 (near the atomizing electrode 1) along the partition wall 30 which serves as the inner wall of the condensation space A1. The guide passage 57 allows the hot air transferred through the high-temperature bypass 56 to flow toward the atomizer housing 5 from the discharge outlet 42 along the partition wall 30 (from downstream of the dehumidifying passage 40 to upstream thereof).

Although not shown, instead of supplying external hot air to the condensation space A1 through the air flow passage 35, there may be used either the heat-radiating part 9 of the cooling cycle F at least a portion of which is located adjacent to the atomizer housing 5 (near the atomizing electrode 1) of the condensation space A1 or a heat transfer member a portion of which is connected to the heat-radiating part 9 and another portion of which is disposed near the atomizer housing 5 in the condensation space A1. In this case, the area near the atomizing electrode 1 in the condensation space A1 may be directly warmed by the heat-radiating part 9 or the heat transfer member, and thus may be maintained under higher temperature and absolute humidity conditions compared to the other area of the condensation space A1, that is, in a state which facilitates the formation of the condensate water on the atomizing electrode 1.

Figure 7:
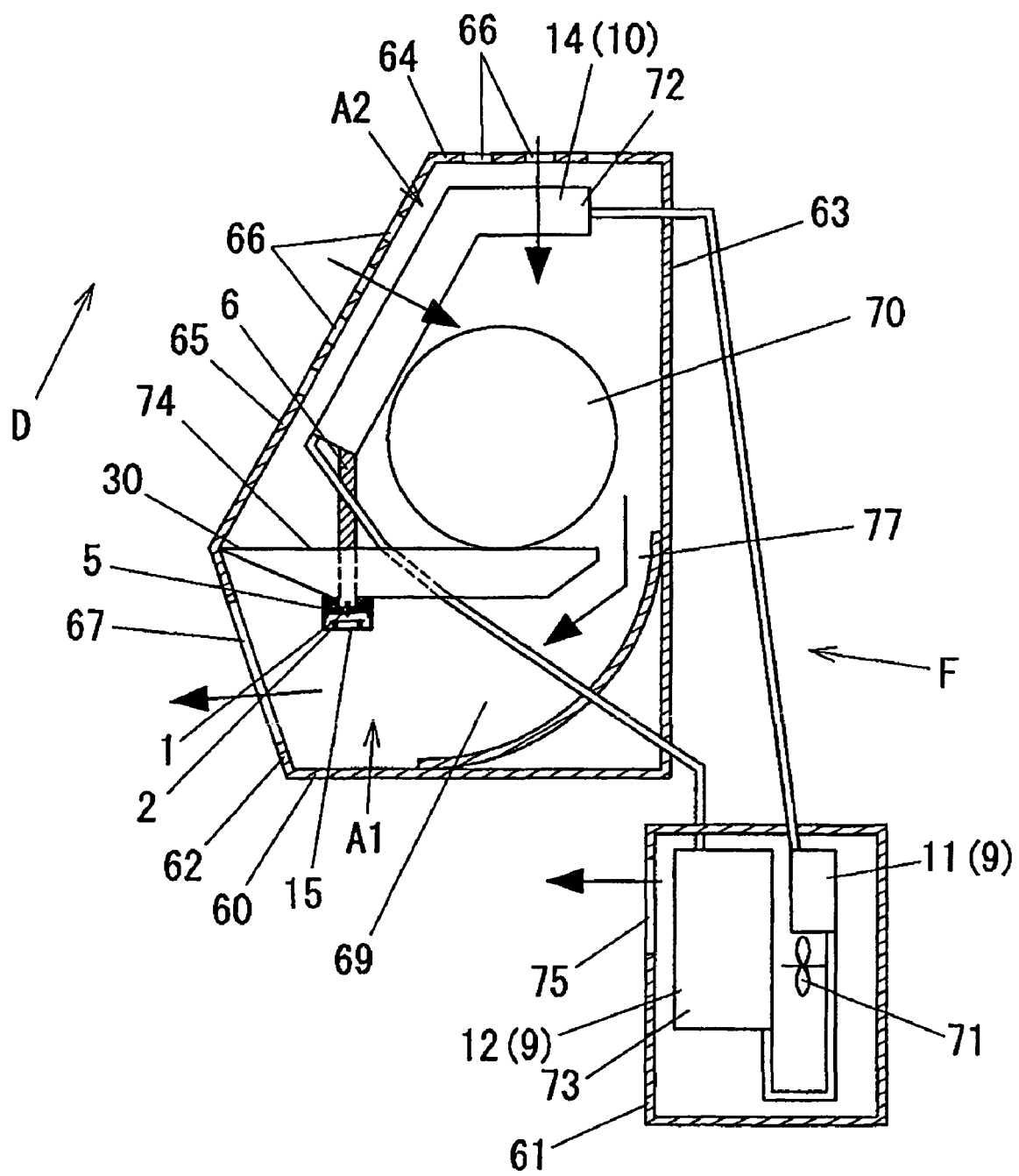
FIG. 7 is a cross-sectional view showing an air conditioner incorporating the electrostatic atomizer therein.
Figure 8:
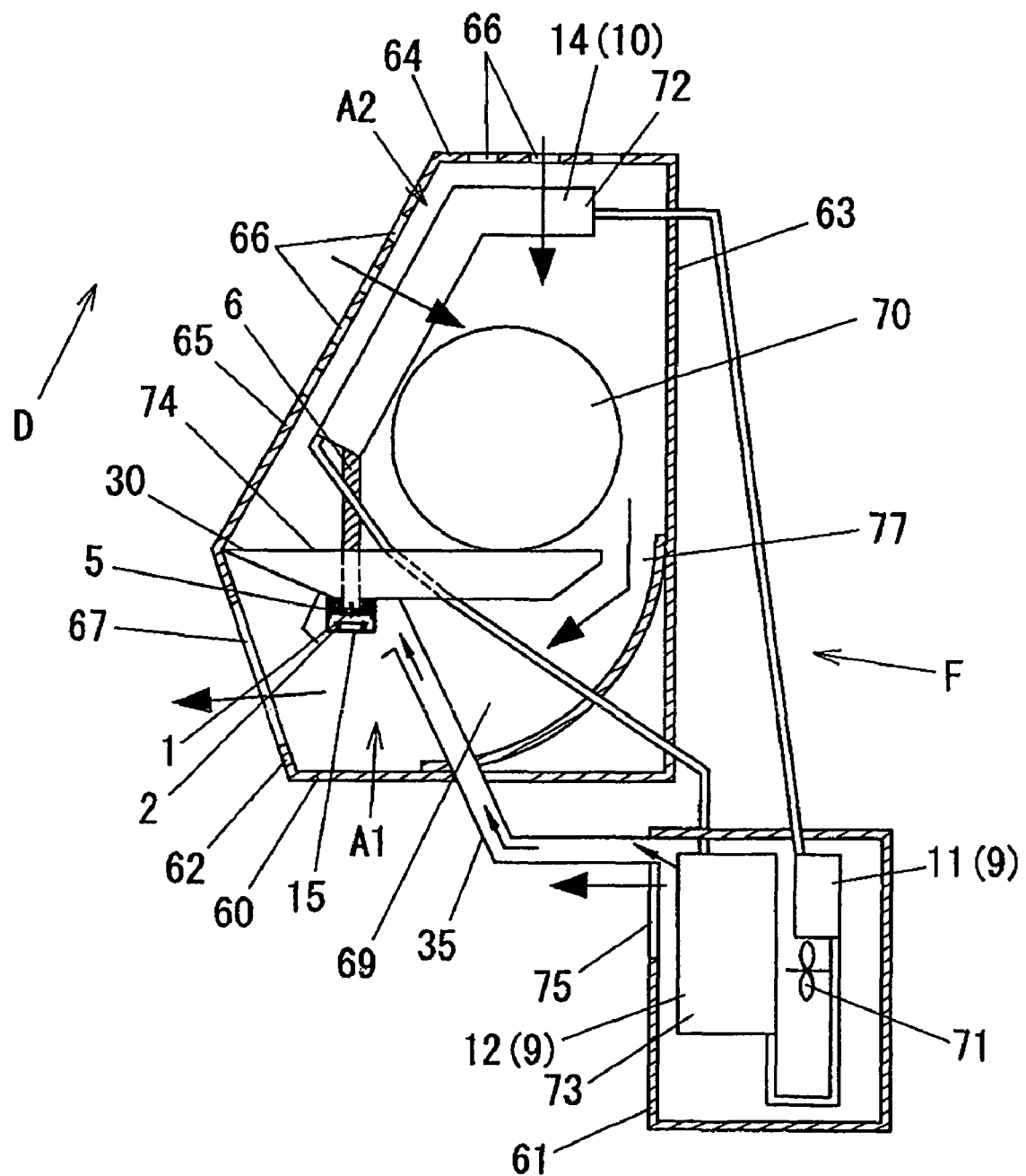
FIG. 8 is a cross-sectional view showing a modification of the air conditioner shown in FIG. 7.

FIG. 7 shows a case where the aforementioned electrostatic atomizer is incorporated in still another coolant-circulating equipment, for example, an air conditioner. The air conditioner includes an indoor unit 60 and an outdoor unit 61. A rear surface 63 of a housing 62 of the indoor unit 60 is mounted to a wall surface of a room which is an air conditioning space D. A plurality of suction inlets 66 is formed in the top surface 64 and the upper portion of the front surface 65 of the housing 62. A discharge outlet 67 is formed in the lower portion of the front surface 65 of the housing 62, the discharge outlet 67 extending in a right and left direction.

In the housing 62, there is provided an air flow path 69 for allowing the suction inlets 66 to communicate with the discharge outlet 67. Provided in the air flow path 69 is an air blower 70 including a fan for suctioning indoor air from the air conditioning space D through the suction inlets 66 and returning it to the air conditioning space D through the discharge outlet 67. A filter (not shown) is provided upstream of the air flow path 69, and an indoor-side heat exchanger 72 constituting a part of the cooling cycle F is disposed downstream of the filter and upstream of the air blower 70.

The cooling cycle F has a coolant circuit which circulates the coolant between an indoor-side heat exchanger 72 including aluminum fins in the indoor unit, an outdoor-side heat exchanger 73 including aluminum fins in the outdoor unit and a compressor 11. While the coolant is circulated in the coolant circuit, the indoor-side heat exchanger 72 functions as an evaporator 14 (corresponding to the cooling part 10) to execute a cooling operation, and the outdoor-side heat exchanger 73 acts as a condenser 12 (corresponding to a heat-radiating part 9) to execute a heat radiation operation.

The air in the air conditioning space D is introduced into the air flow path 69 through the suction inlets 66, and is then cooled while passing through the indoor-side heat exchanger 72 corresponding to the cooling part 10 of the cooling cycle F. Then, the cold air is returned into the air conditioning space D through the discharge outlet 67 formed downstream of the air flow path 69. On the other hand, the air heated by the outdoor-side heat exchanger 73 corresponding to the heat-radiating part 9 in the outdoor unit 61 is discharged to the outside thereof through an air vent 75 by a fan 71 provided in the outdoor unit 61. The expansion valve 13 and the dryer 16 of the cooling cycle F are not shown.

Within the housing 62, a drain tray 74 is disposed under the indoor-side heat exchanger 72 and the air blower 70 to receive the water produced through condensation on the surface of the indoor-side heat exchanger 72. The drain tray 74 is connected with one end of a drain hose (not shown) the other end of which communicates with the outside of the housing 62, so that the condensate water collected in the drain tray 74 by means of the drain hose can be discharged to the outside thereof.

The air conditioner thus constructed incorporates the electrostatic atomizer therein in order to discharge the charged water particles to the cold air cooled by the cooling part 10. The electrostatic atomizer includes an atomizer housing 5 having an atomizing electrode 1 and a heat transfer member 6 thermally connected to the atomizing electrode 1 in the atomizer housing 5. The heat transfer member 6 extends through the bottom of the drain tray 74.

In the air conditioner, the drain tray 74 functions as a heat-insulation partition wall 30. The cooling space A2 containing the cooling part 10 of the cooling cycle F is located above the partition wall 30, whereas the condensation space A1 is located downstream of the cooling part 10 and the air blower 70 in the air flow path 69 below the partition wall 30. In the cooling space A2, the heat transfer member 6 of the electrostatic atomizer is exposed and is brought into contact with the cooling part 10. Alternatively, the heat transfer member 6 may not be in contact with the cooling part 10, and the exposed portion of the heat transfer member 6 may be cooled through the cooling space A2 cooled by the cooling part 10. Further, in the condensation space A1, the atomizing electrode 1 and the counter electrode 2 are located in the atomizer housing 5.

Between the rear end of the drain tray 74 acting as the partition wall 30 and the rear surface 63 of the housing 62, there is provided a gap 77 for allowing the cooling space A2 above the drain tray 74 to communicate with the condensation space A1 below the drain tray 74. Accordingly, in the air flow path 69, the suction inlets 66, the filter, the cooling space A2 having the cooling part 10 located therein, the air blower 70, the gap 77, the condensation space A1 having the atomizing electrode 1 located therein, and the discharge outlet 67 are sequentially disposed in that order from the upstream side. As such, the cooling space A2 and the condensation space A1 are separated from each other by the partition wall 30.

Upon operation of such an air conditioner, in the cooling space A2, the indoor-side heat exchanger 72 corresponding to the cooling part 10 of the cooling cycle F is cooled, and thus the temperature of the atomizing electrode 1 in the condensation space A1 is lowered due to heat exchange through the heat transfer member 6. If the temperature of the atomizing electrode 1 is lowered, the air in the atomizer housing 5 is cooled, so that moisture contained in the air is condensed to produce condensate water on the atomizing electrode 1. Accordingly, water can be stably supplied to the atomizing electrode 1. Then, high voltage is applied between the atomizing electrode 1 and the counter electrode 2, thereby producing a large amount of charged water particles having a nanometer size.

The charged water particles thus produced are discharged through the center hole of the counter electrode 2 and the discharge opening 15 formed in the atomizer housing 5, into the condensation space A1 located downstream of the cooling space A2 and the air blower 70 in the air flow path 69. The charged water particles released into the air flow path 69 are discharged into the air conditioning space D through the discharge outlet 67, along with the cold air carried by the air blower 70.

Because the charged water particles discharged into the air conditioning space D is as small as a nanometer in size to thus exhibit high floatability in air for a long period of time and high dispersive performance, they drift evenly and over a wide area in the air conditioning space D and become attached to the inner surface of the air conditioning space D, any object and/or the human body in the air conditioning space D. Then, the charged water particles attached to the inner surface of the air conditioning space D and/or any object therein exhibit a deodorizing effect, a disinfecting effect on molds and bacteria, and a suppressive effect on propagation thereof.

The charged water particles in which active species exist in a state of being wrapped with water molecules exhibit a longer life span as compared with active species existing independently in the form of free radicals, and thus, dispersive performance, a deodorizing effect, a disinfecting effect on molds and bacteria, and a suppressive effect on propagation thereof can be further enhanced. Also, the charged water particles having a moisturizing effect functions to moisturize the object and/or the skin of the human body in the air conditioning space D.

The air conditioner incorporating the electrostatic atomizer therein adopts the cooling cycle F formed between the indoor unit 60 and the outdoor unit 61 in order to exhibit the intrinsic cooling function of the air conditioner, and utilizes a portion of cooling capacity of the cooling part 10 acting as the indoor unit 60 of the cooling cycle F to produce the condensate water. Specifically, by using the components of the cooling cycle F intrinsically provided in the air conditioner, the condensate water can be stably supplied without a dedicated cooling device such as a Peltier unit for producing the condensate water to be supplied to the atomizing electrode 1, and without a power supply for operating the Peltier unit. Accordingly, the total size of the air conditioner having the electrostatic atomizer can be reduced and low costs and energy-saving effects can be realized.

By separating the condensation space A1 (located downstream of the cooling space A2 and the air blower 70 in the air flow path 69 in the illustrated embodiment) in which the atomizing electrode 1 is located to produce the condensate water from the cooling space A2 (around the cooling part 10 in the air flow path 69 in the illustrated embodiment) in which the cooling part 10 of the cooling cycle F is located to produce the cold air by the drain tray 74 acting as the heat-insulation partition wall 30, the condensation space A1 can be maintained under higher temperature and absolute humidity conditions compared to the cooling space A2, that is, the condensation space A1 can be maintained in a state which facilitates the formation of the condensate water on the atomizing electrode 1.

Further, in the air conditioner, because the atomizing electrode 1 and the counter electrode 2 of the electrostatic atomizer are disposed downstream of the cooling part 10 and the air blower 70, the charged water particles flowing in the air flow path 69 can be efficiently sprayed into the air conditioning space D along the stream of cold air, without contacting with the cooling part 10 including the fins and the air blower 45 including of the fan.

Although the illustrated air conditioner executes only the indoor cooling operation, a 4-way valve may be provided in the coolant circuit to change the circulation direction of the coolant so as to convert the cooling operation to a warming operation and vice versa.

FIG. 8 shows a modification of the coolant-circulating equipment, i.e., the air conditioner, incorporating the electrostatic atomizer therein. In this modification, a description of the same construction as in the embodiment of FIG. 7 will be omitted, and only different constructions from those of the embodiment of FIG. 7 will be described.

In accordance with this modification, there is provided an air flow passage 35 for guiding a portion of hot air heated by the heat-radiating part 9 of the cooling cycle F in the outdoor unit 61 near the atomizing electrode 1 in the condensation space A1 disposed downstream of the air flow path 69. Accordingly, the area in the condensation space A1 near the atomizing electrode 1 can be maintained under higher temperature and absolute humidity conditions compared to the other portion of the condensation space A1, that is, in a state which facilitates the production of condensate water on the atomizing electrode 1.

Most of the air heated by the heat-radiating part 9 in the outdoor unit 61 is discharged to the outside thereof through the air vent 75 of the outdoor unit 61. The amount of hot air supplied to the condensation space Al through the air flow passage 35 is set to be sufficiently smaller than the amount of cold air which is supplied to the condensation space A1 by use of the air blower 70 so as not to affect the cooling capacity of the air conditioner for transferring cold air to indoors. The hot air transferred along the air flow passage 35 is supplied near the atomizing electrode 1 and then combined with the cold air. As mentioned above, because the amount of the hot air is smaller than the amount of the cold air, the combined air exhibiting adequate cooling capacity is supplied to the air conditioning space D.

Although not shown, instead of supplying external hot air to the condensation space A1 through the air flow passage 35, there may be used either the heat-radiating part 9 of the cooling cycle F at least a portion of which is located adjacent to the atomizer housing 5 (near the atomizing electrode 1) of the condensation space A1 or a heat transfer member a portion of which is connected to the heat-radiating part 9 and another portion of which is disposed near the atomizer housing 5 in the condensation space A1. In this case, the area near the atomizing electrode 1 in the condensation space A1 may be directly warmed by the heat-radiating part 9 or the heat transfer member, and thus may be maintained under higher temperature and absolute humidity conditions compared to the other area of the condensation space A1, that is, in a state which facilitates the formation of the condensate water on the atomizing electrode 1. The heat value required for warming the condensation space A1 by using the heat-radiating part 9 is set at a level that does not affect the cooling capacity of the air conditioner for cooling the condensation space A1.

Although there have been described, for illustrative purposes, the embodiments of the present invention regarding the electrostatic atomizer in which the atomizing electrode 1 and the counter electrode 2 are provided and charged water particles are generated through application of high voltage between the atomizing electrode 1 and the counter electrode 2 as shown in FIGS. 1 to 8, the charged water particles may be generated through the application of high voltage to the atomizing electrode 1 without the use of the counter electrode 2.

While the present invention has been shown and described with respect to the exemplary embodiments, it will be understood by those skilled in the art that the invention is not limited to the foregoing embodiments but various changes and modifications may be made without departing from the scope of the invention.

What is claimed is:

1. An electrostatic atomizer comprising:

an atomizing electrode to which a high voltage is applied to atomize water held on the atomizing electrode so as to generate charged water particles; and a cooling unit for producing the water held on the atomizing electrode through condensation, wherein the cooling unit includes a cooling part of a cooling cycle and a heat transfer member, the cooling cycle circulating a coolant between a heat-radiating part and the cooling part and the heat transfer member being in contact with the atomizing electrode and the cooling part; and wherein the atomizing electrode is cooled by means of heat exchange with the cooling part via the heat transfer member.

2. A coolant-circulating equipment comprising:

the electrostatic atomizer as set forth in claim 1.

3. The coolant-circulating equipment of claim 2, further comprising:

a condensation space in which the atomizing electrode is disposed to produce condensate water;

a cooling space in which the cooling part of the cooling cycle is disposed to produce cold air; and a partition wall for separating the condensation space from the cooling space.

4. The coolant-circulating equipment of claim 3, further comprising an air flow passage for guiding air heated by the heat-radiating part of the cooling cycle into the condensation space.

5. The coolant-circulating equipment of claim 4, wherein the heat-radiating part of the cooling cycle or a heat transfer member connected to the heat-radiating part is disposed in the condensation space.

6. The coolant-circulating equipment of claim 3, wherein the heat-radiating part of the cooling cycle or a heat transfer member connected to the heat-radiating part is disposed in the condensation space.

* * * * *